United States Patent [19]

Matsko et al.

[11] 4,181,922

[45] Jan. 1, 1980

[54] CIRCUIT INTERRUPTER WITH IMPROVED ADJUSTABLE TRIP UNIT

[75] Inventors: Joseph J. Matsko, Beaver; Alan B. Shimp, Monroeville; Paul Skalka, Beaver, all of Pa.

[73] Assignee: Westinghouse Electric Corp., Pittsburgh, Pa.

[21] Appl. No.: 853,991

[22] Filed: Nov. 23, 1977

[51] Int. Cl.[2] ........................ H02H 3/08; H01H 77/02

[52] U.S. Cl. ......................................... 361/115; 335/6; 335/172; 361/96

[58] Field of Search ......................... 361/96, 100, 115; 335/6, 160, 172; 338/221, 76, 77

[56] References Cited

U.S. PATENT DOCUMENTS

| | | | |
|---|---|---|---|
| 1,094,156 | 4/1914 | Lowe | 338/221 |
| 2,373,156 | 4/1945 | Wilhelm | 338/77 |
| 3,761,778 | 9/1973 | Willard | 361/115 |
| 3,826,951 | 7/1974 | Mater et al. | 361/96 |
| 4,060,844 | 11/1977 | Davis et al. | 361/96 |

*Primary Examiner*—Harold Broome

*Attorney, Agent, or Firm*—Robert E. Converse, Jr.

[57] ABSTRACT

A circuit interrupter includes an adjustable trip unit for tripping the circuit breaker to the open circuit position upon overload current conditions. The trip unit includes a shorting plug adjuster comprising a pair of connecting pins electrically connected together and insertable into cooperating sockets in the trip unit housing. One of the pins is common to all adjustment positions and is of greater length, having a retaining clip at the end thereof to permit the adjuster to be partially withdrawn, pivoted about the common pin, and inserted into the desired position. The adjuster comprises a flange which covers the trip unit panel socket in all positions, thereby providing protecting against dust and other contamination. The adjuster is cheaper and more reliable than the prior art, providing increased protection against shock, vibration, and contact bounce.

16 Claims, 13 Drawing Figures

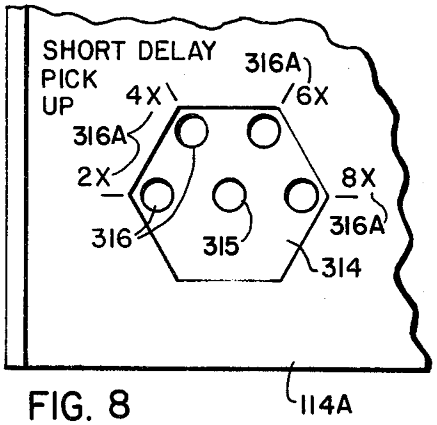
FIG. 8
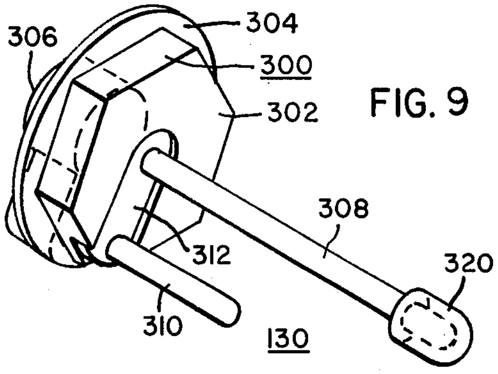
FIG. 9
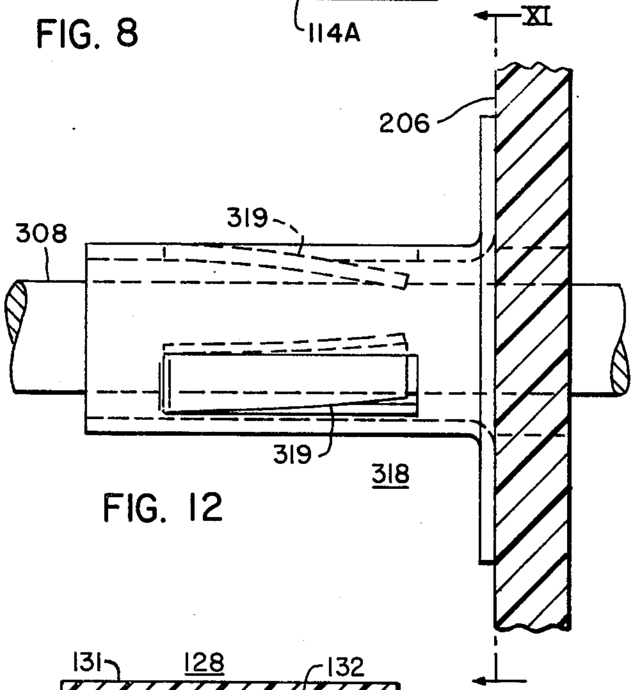
FIG. 12
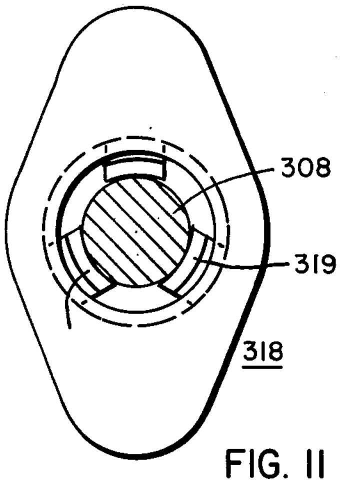
FIG. 11
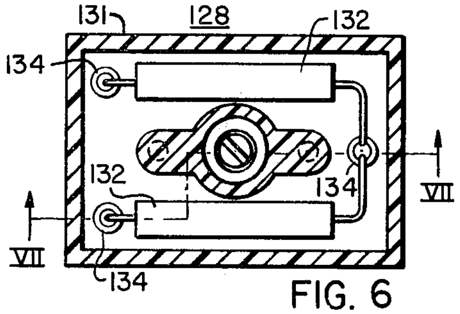
FIG. 6
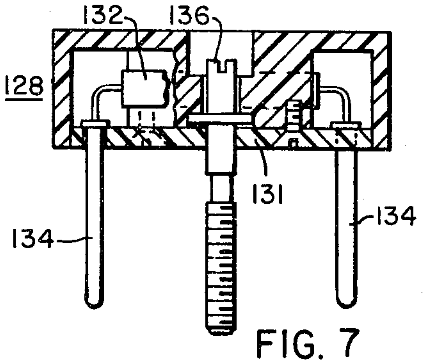
FIG. 7
FIG. 10
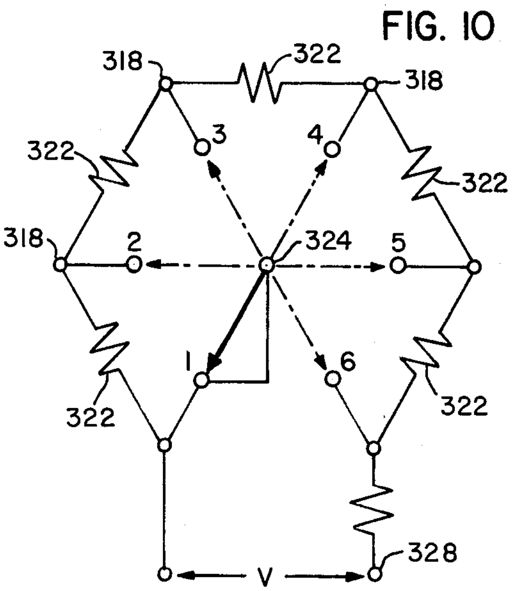

CIRCUIT INTERRUPTER WITH IMPROVED ADJUSTABLE TRIP UNIT

CROSS-REFERENCE TO RELATED APPLICATIONS

The present invention is related to material described in copending U.S. patent application Ser. No. 853,983, entitled "Circuit Breaker With Interlocked Removable Trip Unit" filed Nov. 23, 1977 by J. J. Matsko et al.; U.S. patent application Ser. No. 853,940, entitled "Circuit Interrupter With Interchangeable Rating Adjuster And Interlock Means" filed Nov. 23, 1977 by A. E. Maier et al.; U.S. patent application Ser. No. 728,088, filed Sept. 30, 1976 by A. B. Shimp et al.; U.S. patent application Ser. No. 811,227, entitled "Trip Mechanism Reset" filed June 29, 1977 by S. A. Mrenna et al., and U.S. patent application Ser. No. 853,990, entitled "Circuit Interrupter Having Interlocked Interchangeable Trip Unit" filed Nov. 23, 1977 by A. E. Maier et al. Each of the above-mentioned applications is assigned to the assignee of the present invention.

BACKGROUND OF THE INVENTION

1. Field of the Invention

The invention relates generally to electrical apparatus, and more particularly to circuit breakers having adjustable trip units.

2. Description of the Prior Art

Circuit breakers are widely used to provide protection against damage to distribution circuits and connected apparatus during overcurrent conditions. In complex distribution systems, it is usually desirable for the circuit breaker closest to the fault to open, or trip, in order to limit an interruption in electrical service to as small an area as possible. Therefore, many system circuit breakers are provided with trip units which are adjustable as to both the overcurrent level which will cause the breaker to trip and the time delay during which the breaker will tolerate an overcurrent condition before initiating a tripping operation.

The main requirement of a circuit breaker and its associated components is reliability. It is absolutely essential, during those relative rare occasions on which the circuit breaker is called upon to perform, that it initiate a tripping operation at exactly the level and with exactly the time delay as contemplated by the system designer.

A second important consideration is cost. In the highly competitive market for circuit breakers, the manufacturer who can produce a product performing to specification at a lower cost is placed at significant advantage in the marketplace. Other considerations in circuit breaker design are also important, such as the requirement that maintenance and adjustment be quick and convenient to perform.

A circuit breaker having an adjustable trip unit meeting the above requirements is described in U.S. Pat. No. 3,826,951 issued July 30, 1974 to A. E. Maier and A. B. Shimp. Other prior art circuit breakers having adjustable trip units employed switches having standard wiper contact type of operation. Still other adjustable trip units employed a plurality of threaded studs attached to a circuit board. By tightening a nut on a particular stud, the nut provided electrical contact between the stud and an adjacent conductor on the circuit board.

While the adjustment mechanism of a circuit breaker trip unit must be highly reliable, it need not perform the same number of operations as regular switches. The expected number of trip unit adjustment operations, for example, would usually be in the range of several hundred rather than the hundreds of thousands or even millions of operations required of many switches. However, the environments in which circuit breaker trip units must operate are often times extremely severe. Dust, shock, and vibration all can produce failure in an improperly designed trip unit adjustment mechanism. It is therefore desirable to provide a circuit breaker having a trip unit with improved adjustment means. Such a circuit breaker should exhibit excellent resistance to contamination, vibration, and shock and at the same time be more economical to construct than prior art adjustable trip unit circuit breakers.

SUMMARY OF THE INVENTION

In accordance with the principles of the present invention there is provided a circuit interrupter comprising a circuit breaker structure, means for sensing current flow through said circuit interrupter, a shunt trip device, and an adjustable trip unit electrically connected between the sensing means and the shunt trip device of the circuit breaker. The trip unit includes electronic circuitry for analyzing the current flow through the circuit interrupter as detected by the sensing means and for initiating a trip signal to the shunt trip device of the circuit breaker after a predetermined time delay. The trip unit also includes means for adjusting the current level at which the tripping indication will be generated and for specifying the time delay characteristics of the trip signal indication.

The adjusting means comprises a shorting plug including a plurality of connecting pins inserted in corresponding sockets mounted in the housing of the trip unit and connected to elements of the electronic circuitry. At least two of the connecting pins of the shorting plug are in direct electrical connection with each other. The shorting plug is inserted into any of a variety of positions to establish tripping current levels and time delay characteristics. One of the connecting pins of each shorting plug is longer than the other pins, permitting the shorting plug to be partially withdrawn, pivoted about the longer pin, and reinserted into the desired position. An insulated button at the end of the longer pin prevents complete removal of the shorting plug. Each shorting plug includes a base in the shape of a polygon cooperating with a correspondingly shaped recess in the panel of the trip unit. The shorting plug thus can only be inserted at certain discrete positions at which the base will mate with the corresponding surfaces of the trip unit panel recess. Each shorting plug also includes a flange covering all positions of each socket, thereby preventing contamination by dust or other matter.

Each socket comprises a plurality of leaf spring members for gripping an inserted connecting pin to form electrical contact with a plurality of surfaces thereof.

The disclosed adjusting means comprising a shorting plug provides greater reliability than the prior art at a significantly lower cost.

BRIEF DESCRIPTION OF THE DRAWINGS

FIG. 6 is a sectional view of the replaceable rating adjuster taken along the line VI—VI of FIG. 3;

FIG. 7 is a sectional view of the rating adjuster shown in FIG. 6, taken along the line VII—VII;

FIG. 8 is a detailed front elevational view of a portion of the trip unit panel with a shorting plug removed;

FIG. 9 is a perspective view of one of the shorting plugs shown in FIG. 10;

FIG. 10 is a schematic view of a portion of the trip unit electronic circuitry;

FIG. 11 is a detail rear view of one of the rating adjuster sockets; and

FIG. 12 is a detail side view of one of the rating adjuster sockets.

DESCRIPTION OF THE PREFERRED EMBODIMENT

Figure 1:
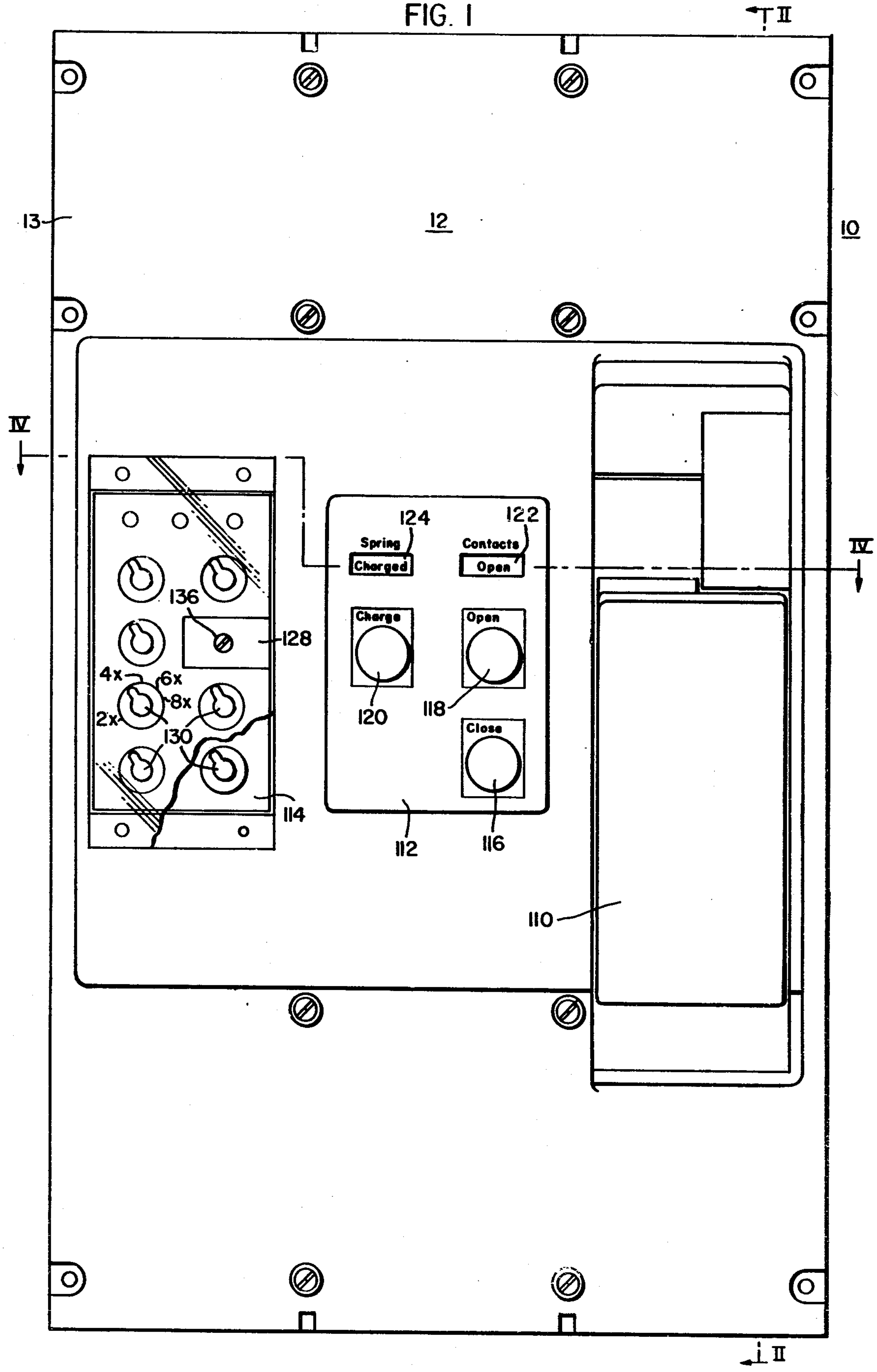
FIG. 1 is a front-elevational view of a circuit interrupter employing the principles of the present invention.
Figure 2:
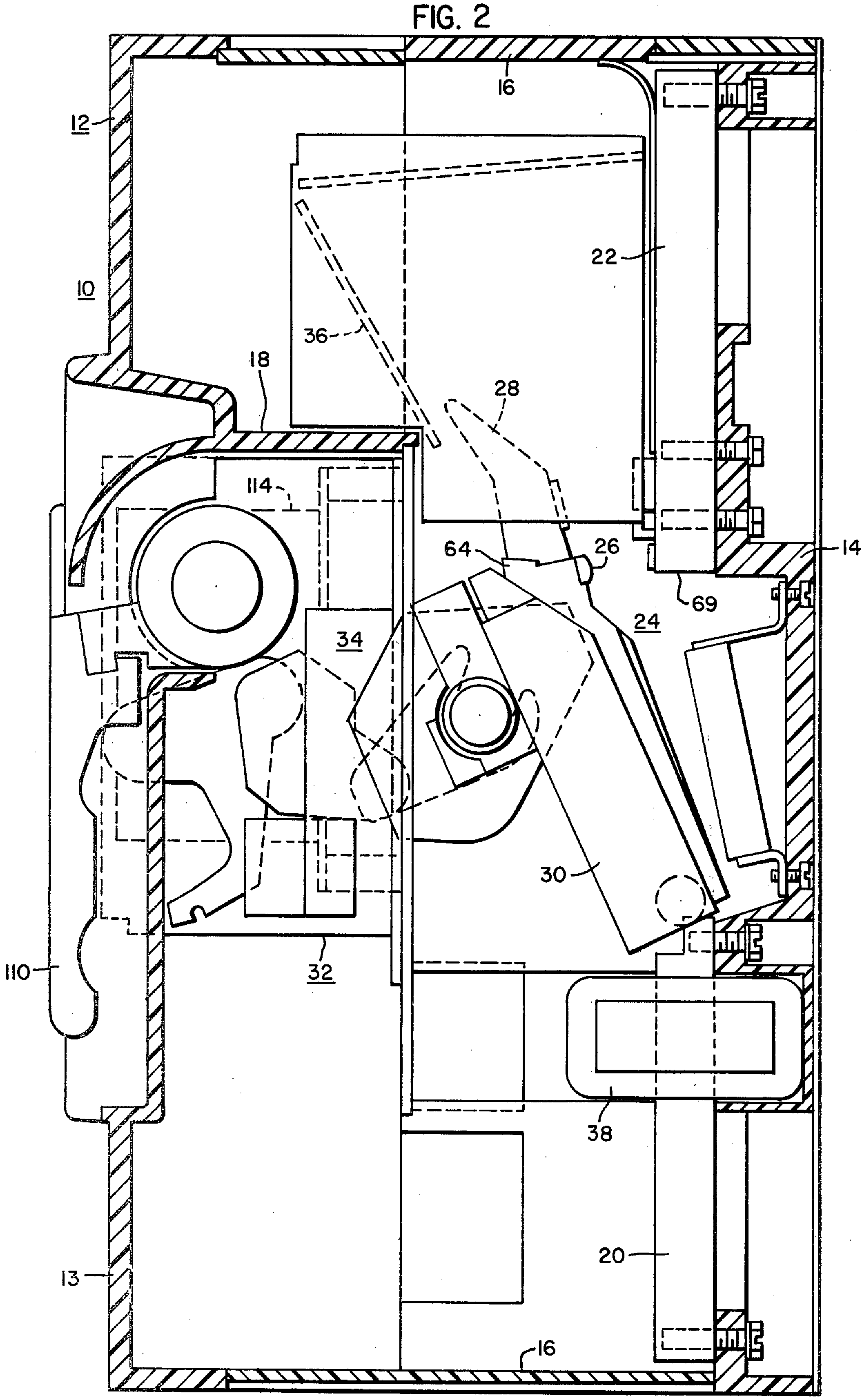
FIG. 2 is a side-sectional view of the circuit breaker of FIG. 1, taken along the line II—II of FIG. 1.

Referring now to the drawings, in which like reference characters refer to corresponding members, there is shown in FIGS. 1 and 2 a stored energy molded case circuit breaker 10 constructed in accordance with the principles of the present invention. Although the description of the invention is made with reference to this particular circuit breaker which is described more completely in the aforementioned U.S. patent application Ser. No. 811,227 it is to be understood that the invention is applicable to circuit breakers generally. The circuit breaker 10 includes a housing 12 comprising a cover 13, a mounting base 14, side walls 16, and a frame structure 18. A pair of stationary contacts 20, 22 are disposed within the housing 12. Stationary contact 22 would, for example, be connected to an incoming power line (not shown), while the other stationary contact 20 would be connected to the load (not shown). Electrically connecting the two stationary contacts 20, 22 is a movable contact structure 24. Movable contact structure 24 comprises a movable contact 26, a movable arcing contact 28, a contact carrier 30, and a contact holder 64. The movable contact 26 and the arcing contact 28 are pivotally secured to the stationary contact 20, and are operable between open and closed positions with respect to the stationary contact 22. Throughout this specification, the term "open" is used with respect to the contact positions means that the movable contacts 26, 28 are spaced apart from the stationary contact 22, whereas the term "closed" indicates the position wherein the movable contacts 26, 28 are contacting both stationary contacts 22 and 20. The movable contacts 26, 28 are mounted to and carried by the contact carrier 30 and contact holder 64.

Also included within the circuit breaker 10 is an operating mechanism 32, a toggle means 34, and an arc chute 36 which extinguishes any arc which may be present when the movable contacts 26, 28 are operated from the closed to the open position. A current transformer 38 is utilized to monitor the amount of current flowing through the stationary contact 20.

FIG. 1 shows the front of the cover 13 and the relative positions of an operating handle 110, a control panel 112, and a trip unit 114. The handle 110 is used for manual operation to charge powerful operating springs (not shown) providing stored energy to move the contacts 26, 28 between open and closed positions. This movement is controlled from the control panel 112 which includes push buttons 116, 118, 120 and indicating flags 122 and 124. The button 120 is used to activate a motor (not shown) which can perform the same operation as the handle 110 to charge the operating springs. When the springs are so charged, this status is indicated by the flag 124. Manual operation of the push button 116 or 118 will serve to discharge the operating springs and move the contacts 26, 28 between the open and closed positions. Such operation thus provides a switching function during periods of normal conditions.

During overload current conditions on the circuit, the contacts 26, 28 will move automatically from the closed to the open position. The characteristics of this tripping operation are controlled by the trip unit 114 which contains electronic circuitry to process the sensing signals produced by the transformer 38. This circuitry is described more completely in the aforementioned U.S. patent application Ser. No. 728,088 and is connected to the trip coil of a shunt trip device (not shown) of conventional construction. The nominal level of current which will initiate the tripping operation, i.e., the trip current rating, is determined by a removable plug-in rating adjuster 128 which contains resistance means cooperating with the electronic circuitry within the trip unit 114 to establish the trip current rating. Other characteristics of the trip unit are adjustable through the use of shorting plugs 130 to be more completely described hereinafter.

The construction of the rating plug 128 is seen most clearly in FIGS. 6 and 7. A housing 131 of molded insulating material contains a pair of resistors 132 supported upon plug-in connecting pins 134. A threaded rod or screw 136 extends through the housing 131 and is movably secured to the base of the housing 131.

Figure 3A:
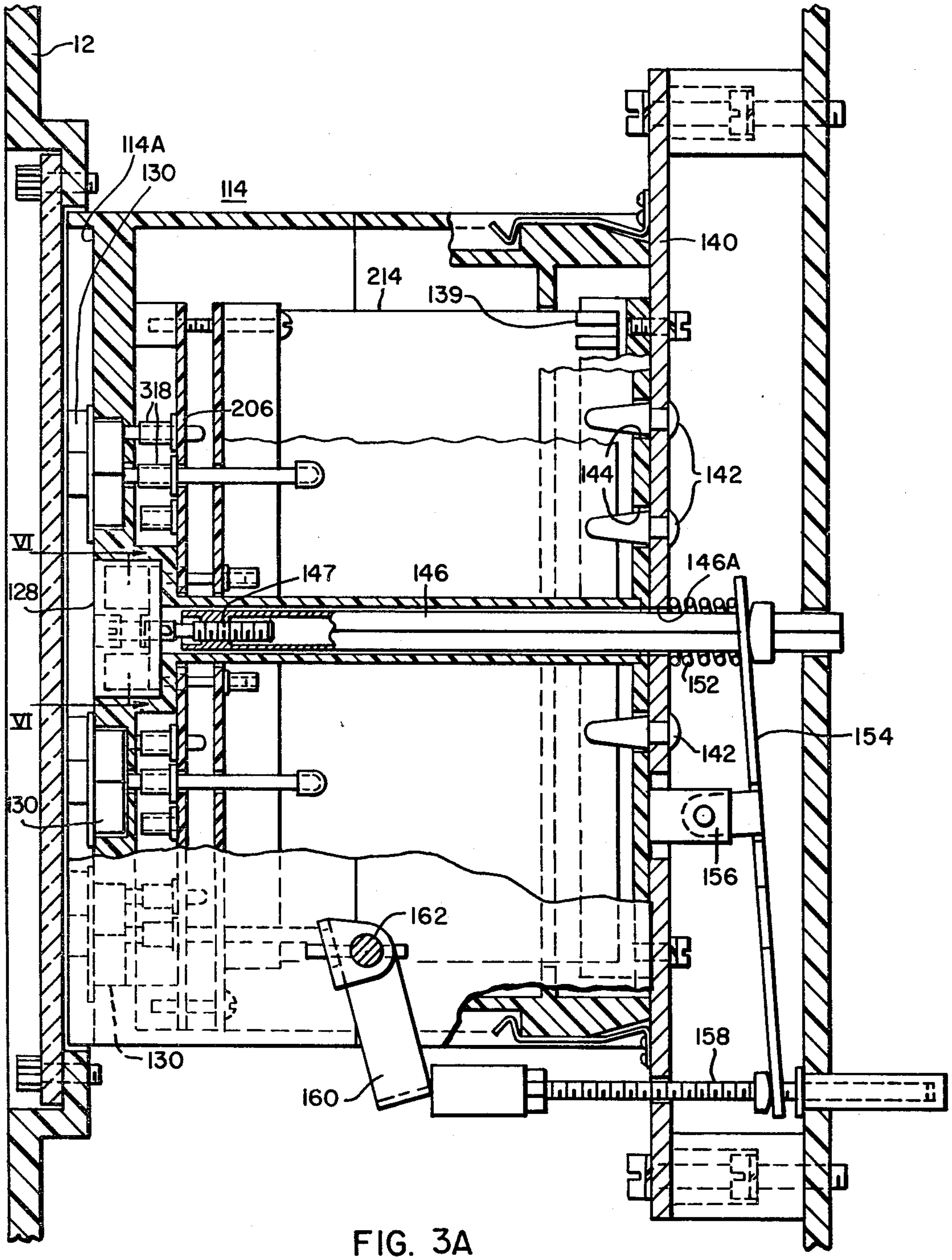
FIG. 3A is a detailed side-sectional view of the trip unit portion of the circuit interrupter shown in FIGS. 1 and 2.
Figure 5:
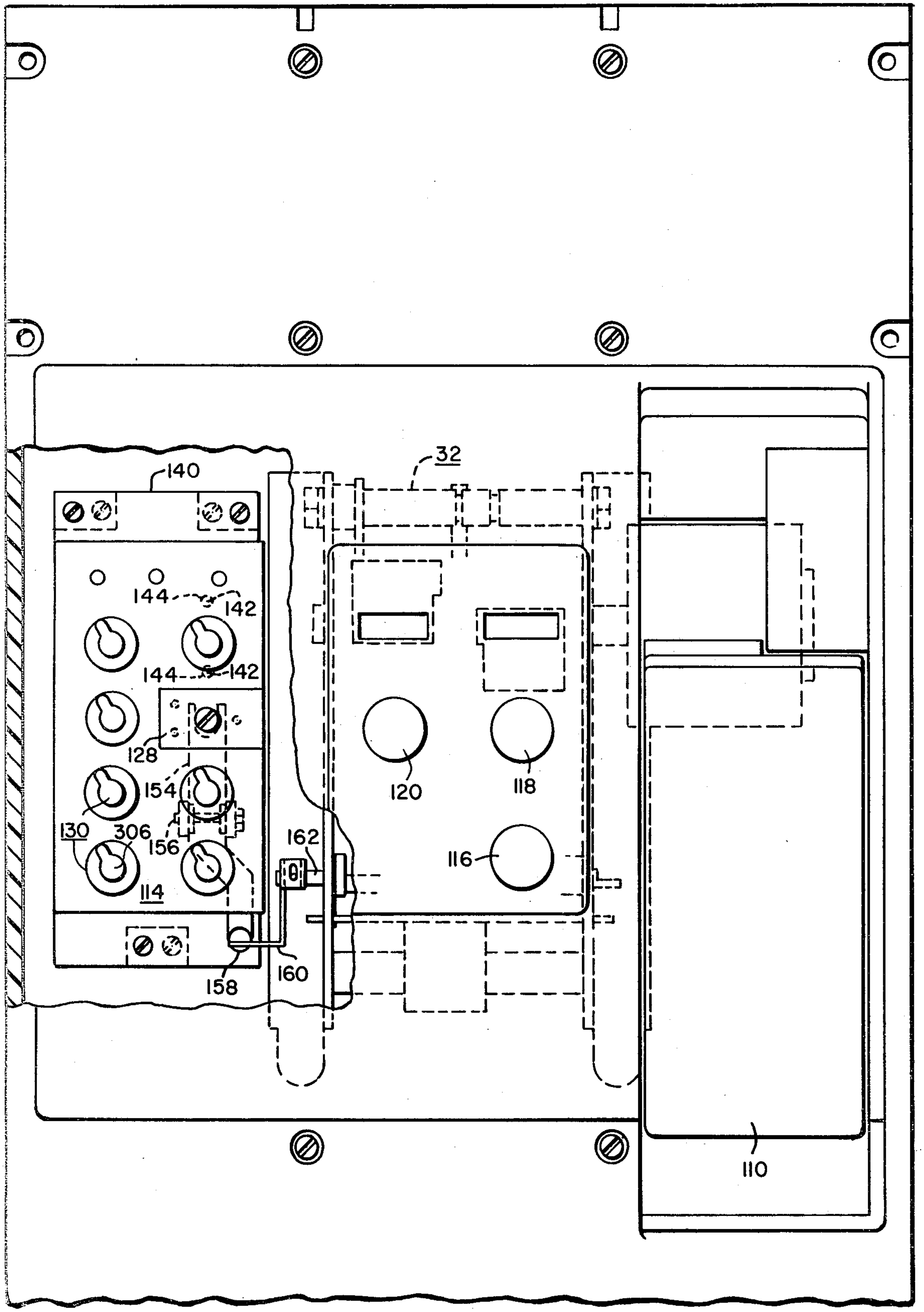
FIG. 5 is a view similar to FIG. 1 partially cut away to details of the rating adjuster interlock mechanism.

Referring now to FIG. 3A, it can be seen that the trip unit 114 is seated in a recess of the housing 12 and rests upon a steel mounting plate 140. Electronic circuitry mounted on a board 214 within the trip unit 114 is joined through a plug-in connectors 139, to the sensing transformer 38 (FIG. 2), the contact 22 (supplying signal and power to the circuitry), and the shunt trip device. The trip unit 114 is located in the housing recess by rejection pins 142 mounted upon and extending upward from the plate 140. Corresponding holes 144 (FIG. 5) are drilled in the bottom of the trip unit housing. The pins and holes 142 and 144 are arranged in identical patterns such that the pins are received by the holes. Circuit interrupters having different electrical characteristics such as ground fault detection capability, higher interruption rating, etc., have rejection pins 142 arranged in different patterns. Similarly, different trip units 114 having electrical characteristics corresponding to the circuit interrupters have different patterns of holes 144. In each case, the pin pattern and hole pattern for compatible circuit interrupters and trip units is the same, such that only trip units having circuitry compatible with the particular circuit interrupter can be properly inserted in the housing 14. If a non-compatible trip unit is attempted to be inserted, the pins 142 and holes 144 will not line up and the trip unit cannot be seated in the housing. Thus, a common mold can be used for all circuit breaker housing and all trip unit housing while still maintaining a rejection capability to prevent mating of non-compatible trip units and circuit breakers.

As can be seen in FIG. 3A, a hexagonally shaped tapped tube 146 extends through a hexagonally shaped hole 146A in the mounting plate 140. The tapped tube 146 is free to move right and left in FIGS. 3A, but is prevented from rotating by the sides of the hole 146A. A compression spring 152 is mounted around the tapped tube 146. The tapped tube 146 rides upon a lever 154 pivotally mounted at 156 to the mounting plate 140. The other end of the lever 154 is connected to a push rod 158 which in turn pushes a lever 160 attached to the trip arm 162 of the circuit breaker mechanism 32. As is described in the aforementioned copending U.S. patent application Ser. No. 811,227, clockwise rotation of the trip arm 162 is operable to release the toggle mechanism 34 causing the contacts 126, 128 to move to the open position.

Figure 3B:
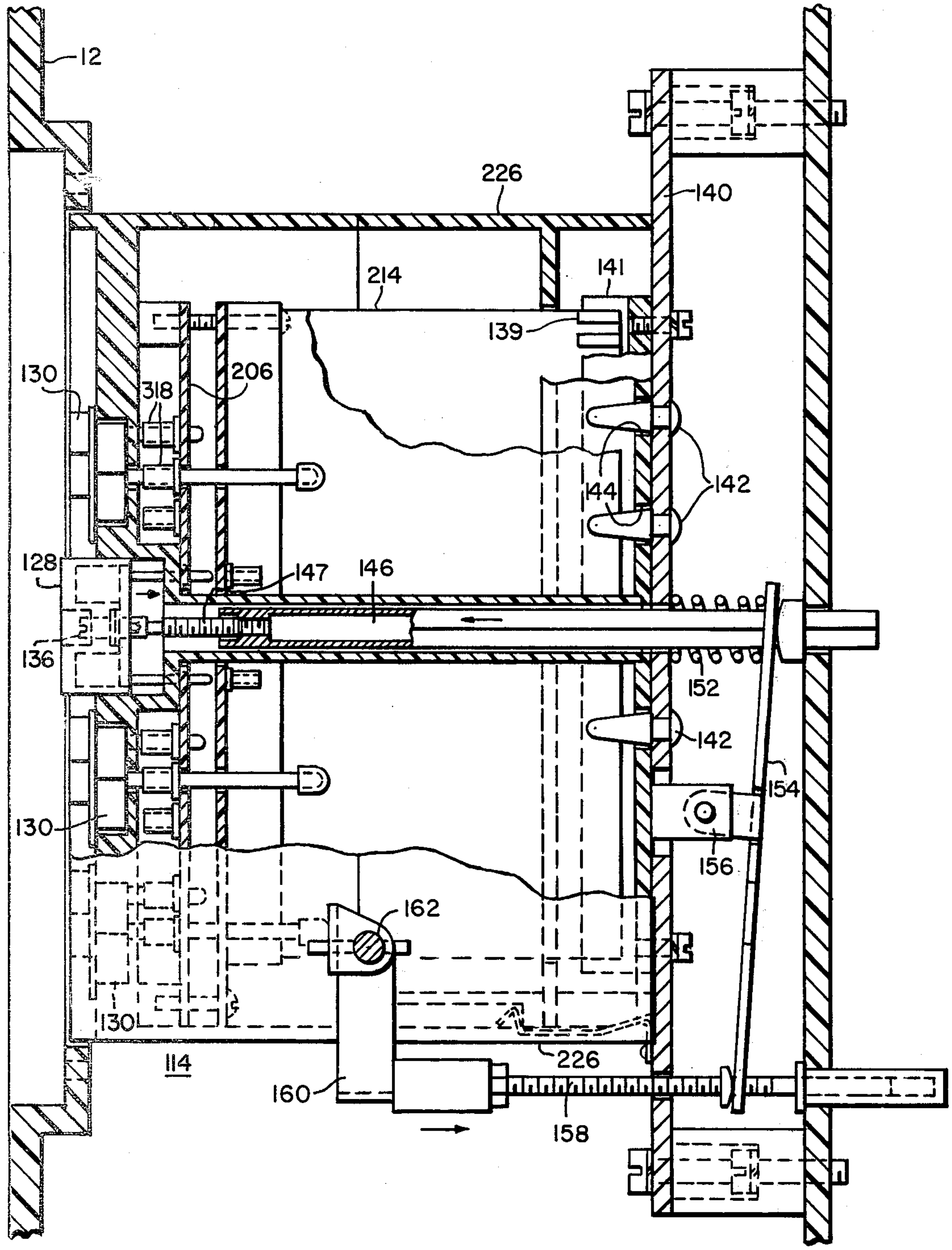
FIG. 3B is a view similar to FIG. 3A showing a partially inserted rating adjuster.
Figure 4:
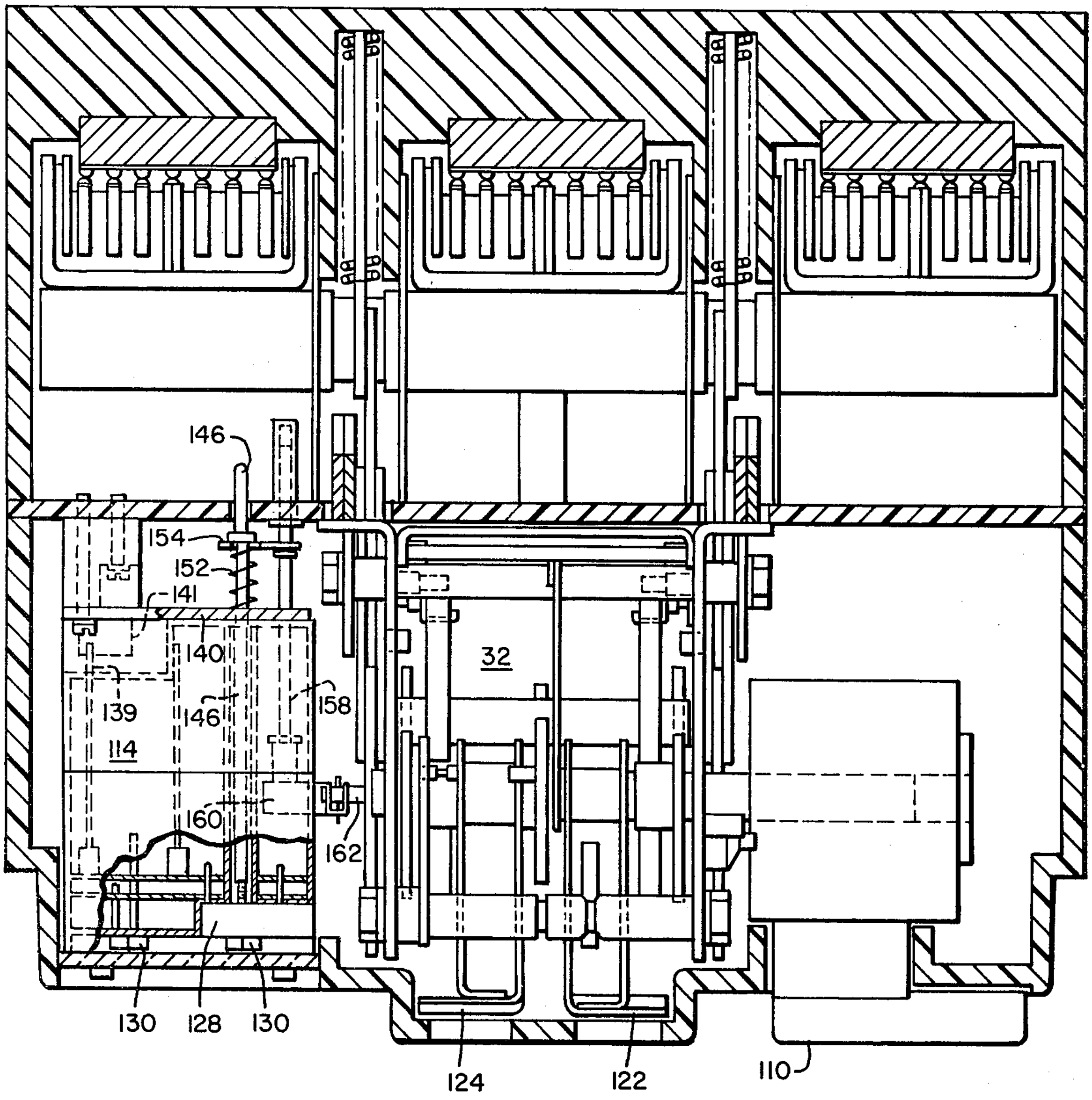
FIG. 4 is a sectional view of the circuit interrupter taken substantially along the line IV—IV of FIG. 1.

With the rating adjuster 128 fully inserted into the recess into the housing of the trip unit 114, it can be seen that the screw 136 can be rotated to engage a threaded portion 147 of the tapped tube 146, thereby drawing the tube 146 upward against the biasing action of the spring 152. The lever 154 is then raised, removing bias force from the trip arm 162, allowing the circuit breaker to be normally operated to any desired open or closed position. If the rating adjuster 128 is not fully inserted into the housing of the trip unit 114 (as in FIG. 3B), or if an improper rating adjuster is inserted, the compression spring 152 will bias the lever 154 downward, causing the push rod 158 to be raised, thereby maintaining the trip arm 162 in a position of clockwise rotation. This position, as is described in the aforementioned U.S. patent application Ser. No. 811,227, maintains the circuit breaker in the trip-free condition, whereby it is not possible to cause the contacts 126, 128 to close. The position of the threaded portion 147 within the tapped tube 146 and the length of the screw 136 are coordinated such that only compatible rating plugs, trip units, and circuit breakers with allow the screw 136 to engage the tapped rod 146 in such a manner as to remove the breaker from the trip-free condition. The operation and construction of the rating adjuster interlock mechanism are more completely described in the aforementioned U.S. patent application Ser. No. 853,940.

Referring now to FIG. 9, there is shown a perspective view of one shorting plug 130 used to adjust the electrical characteristics of the trip unit circuitry. The shorting plug comprises a molded insulating body 300 having a hexagonally shaped base 302 and a circular flange 304. A combination indicator and gripping member 306 is formed on the side of the flange 304 opposite the hexagonally shaped base. A pair of connecting pins 308, 310 of steel, phosphor bronze, or other suitable conductive material are molded into the base 302. A jumper plate 312 is seated in a slot of the base 302 and electrically connects the pins 308 and 310. As can be seen, the pin 308 is centered in the base 302 and is significantly longer than the pin 310 situated at the outer edge of the base.

Referring to FIG. 8, the front panel 144A of the trip unit 114 includes hexagonally shaped recesses 314 in which are situated a center hole 315 and a plurality of regularly spaced circumferentially arranged holes 316. A legend 316A is inscribed in the panel 114A next to each hole 316, corresponding to a selectable tripping parameter value for each hole 316. All holes 315 and 316 extend through to a plurality of female connecting sockets 318. The sockets 318 are riveted onto a printed circuit board 206 and are soldered to the conductive paths on the board. The relationship of the printed circuit board, the panel, and the shorting plug 130 can be seen most clearly in FIG. 3A. The sockets 318 are shown in FIGS. 11 and 12. A retaining button 320 is slipped over a groove at the end of the connecting pin 308 after insertion of the shorting plug 130 and serves to prevent complete removal of the shorting plug 130, yet allows the shorting plug to be partially removed such that the pin 310 is disengaged from a connecting socket. The shorting plug 130 can then be rotated and inserted in any desired position.

FIG. 10 shows a portion of the electronic circuitry of the trip unit, a more complete description of which is found in the aforementioned U.S. patent application Ser. No. 728,088. As can be seen in FIG. 10, a plurality of series-connected resistors 322 have the sockets 318 connected therebetween. The center connecting pin 308 is common and is at all times electrically connected to a terminal 324 behind the center hole 315. By withdrawal, rotation, and reinsertion of the shorting plug 130, the terminal 324 can be selectively connected to any of the other sockets 318. Thus, the resistance between the points 324 and 328 can be adjusted according to the position of the shorting plug. This change in resistance is used to vary the electrical parameters of the electronic circuitry of the trip unit 114 to select the desired time-current tripping characteristic for the breaker. Other electrical characteristics, such as capacitance, could also be varied by the shorting plug 130 to vary electronic circuit parameters and select the desired breaker operating characteristics. In the preferred embodiment the electronic circuitry is designed so that withdrawal of a shorting plug or failure of a shorting plug to make proper contact will cause the particular trip unit characteristic to revert to its lowest current or time value. This is a failsafe condition.

Although the base 302 and recess 314 are formed in the shape of a hexagon, they could of course be formed in any desired polygonal shape. By spacing the holes and sockets 316, 318 evenly about the center hole and socket 315 at an angle equal to 360 divided by the number of sides of the base, the plug 130 may be more easily and reliably positioned. The action of base 302, recess 314, and flange 304 provides a snug fit and protects the sockets 318 from dust and other contamination.

Since unlike wiper-type switching contacts the shorting plug 130 need not be designed for an extremely large number of operations, the objective in wiper-type switch contacts of a low contact pressure to prevent undue wear is not a factor. Therefore, a relatively high contact pressure can be employed through the use of the multiple leaf spring members 319 of the sockets 318. These provide a plurality of gripping points and a high contact force to insure reliable electrical contact and reduce problems from vibration and corrosion.

The operation necessary to adjust the time-current tripping characteristics of the trip unit 114 through the use of the shorting plug 130 is convenient, yet it requires a positive action on the part of maintenance or installation personnel, such that inadvertent adjustment of the shorting plug is extremely unlikely. Furthermore, the shorting plug cannot be completely removed from the trip unit and is thus not susceptible to loss. The combination of high contact pressure on the connecting pins 308 and 310 of the shorting plug and the protection of the unused sockets 318 by the base 302 and flange 304 produce extremely reliable operation over extended periods of time. The shorting plug also is simple in construction, resulting in a lower manufacturing cost than a standard wiper-type switch.

It can be seen therefore that the present invention provides a circuit breaker having an adjustable trip unit which provides an increase in performance and reliability at a lower cost than the prior art.

We claim:

1. A circuit interrupter comprising:

a housing, a circuit breaker mechanism supported within said housing and comprising separable contacts, an operating mechanism for moving said contacts between open and closed positions, and a releasable trip mechanism operable when actuated to automatically move said contacts to the open position;

means for sensing current flow through said contacts;

a trip unit comprising electronic circuit means connected to said sensing means and said trip mechanism for actuating said trip mechanism upon overcurrent conditions, said trip unit comprising means for adjusting circuit parameters thereof to specify conditions which will result in a tripping operation, said adjusting means comprising a shorting plug having a plurality of pins at least two of which are electrically connected together, said trip unit comprising a plurality of sockets adapted to receive said pins and a plurality of electronic circuit components connected to said sockets, the number of said sockets being greater than the number of said pins so that said shorting plug can be inserted in a plurality of positions, whereby insertion of said shorting plug into said sockets is operable to select desired electronic circuit components for operation in said trip unit.

2. A circuit interrupter as recited in claim 1 wherein said trip unit comprises a front panel and a plurality of legends inscribed thereon representing selectable tripping parameter values, each of said legends being associated with one of said shorting plug insertion positions, and said shorting plug comprises indicating means aligning with one of said legends when said shorting plug is inserted into each of said positions, thereby indicating the tripping parameter value selected.

3. A circuit interrupter as recited in claim 1 wherein one of said connected pins is a common pin and is inserted in the same socket for all positions of said shorting plug.

4. a circuit interrupter as recited in claim 3 wherein said common pin is of greater length than the remaining pins and said shorting plug is pivotal about said common pin when said remaining pins are withdrawn from their respective sockets.

5. A circuit interrupter as recited in claim 4 wherein said common pin comprises retaining means attached to the end thereof for prohibiting said common pin from being totally withdrawn from said trip unit.

6. A circuit interrupter as recited in claim 1 wherein said sockets each comprise a plurality of contact leaf springs adapted to grip an inserted pin and provide electrical contact to a plurality of surfaces thereof.

7. A circuit interrupter as recited in claim 6 wherein said trip unit comprises a front panel inscribed with a plurality of legends representing selectable tripping parameter values, each of said legends being associated with one of said shorting plug insertion positions, and said shorting plug comprises indicating means aligning with one of said legends when said shorting plug is inserted into each of said positions thereby indicating the tripping parameter value selected.

8. A circuit interrupter as recited in claim 6 wherein one of said connected pins is a common pin and is inserted in the same socket for all positions of said shorting plug.

9. A circuit interrupter as recited in claim 8 wherein said common pin is of greater length than the remaining pins and said shorting plug is pivotal about said connecting pin when said remaining pins are withdrawn from their respective sockets.

10. A circuit interrupter as recited in claim 9 wherein said common pin comprises retaining means attached to the end thereof for prohibiting said common pin from being totally withdrawn from said trip unit.

11. A circuit interrupter as recited in claim 1 wherein said shorting plug comprises a flange which, when said plug is inserted into said trip unit, covers all of said socket entrances.

12. A circuit interrupter as recited in claim 11 wherein said sockets are disposed about a circle centered on one of said sockets, the remainder of said sockets being spaced about said circle in multiples of a predetermined angle and being positioned in a polygonal recess of said trip unit panel, said shorting plug having a base shaped in a similar polygon adapted to be received by said trip unit recess, the number of sides in said polygon being equal to 360 divided by the number of degrees of said predetermined angle.

13. A circuit breaker as recited in claim 12 wherein said common pin is of greater length than the remaining pins of said shorting plug is pivotal about said connecting pin when said remaining pins are withdrawn from their respective sockets.

14. A circuit breaker as recited in claim 13 wherein said common pin comprises retaining means attached to the end thereof for prohibiting said common pin from being totally withdrawn from said trip unit.

15. A circuit breaker as recited in claim 14 wherein said plug base and said trip unit panel recess are hexagonally shaped.

16. An adjustable trip unit adapted for use with a circuit interrupter and associated sensing means to cause the circuit interrupter to trip upon detection of predetermined electrical characteristics on a circuit passing therethrough, said adjustable trip unit comprising:

output means adapted for connection to the shunt trip device of the associated circuit interrupter;

input means adapted for connection to the associated sensing means;

a housing;

electronic circuitry disposed in said housing and connected to said input and output means for generating a trip signal upon detection of a predetermined set of electrical parameter values on a circuit through the associated breaker; and means for specifying said set of electrical parameter values; said specifying means comprising a plurality of first connecting members mounted within said housing and electrically connected to a plurality of components of said electronic circuitry, a removable shorting plug comprising a plurality of second connecting members cooperating with said first connecting members to form electrical contact therebetween and having at least two of said second connecting members in direct electrical connection to each other, the number of said first connecting members being sufficiently greater than the number of said second connecting members such that said shorting plug may be inserted into any of a plurality of positions in said trip unit to selectively connect certain of said circuit components into said electronic circuitry, whereby said set of electrical parameter values are specified.

* * * * *